(No Model.)
C. E. BUCKLAND.
DRINKING GLASS.
No. 392,145. Patented Oct. 30, 1888.
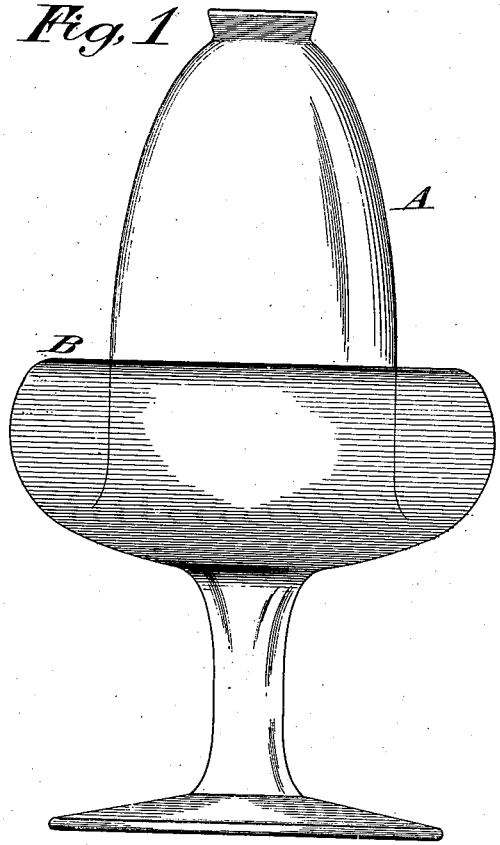
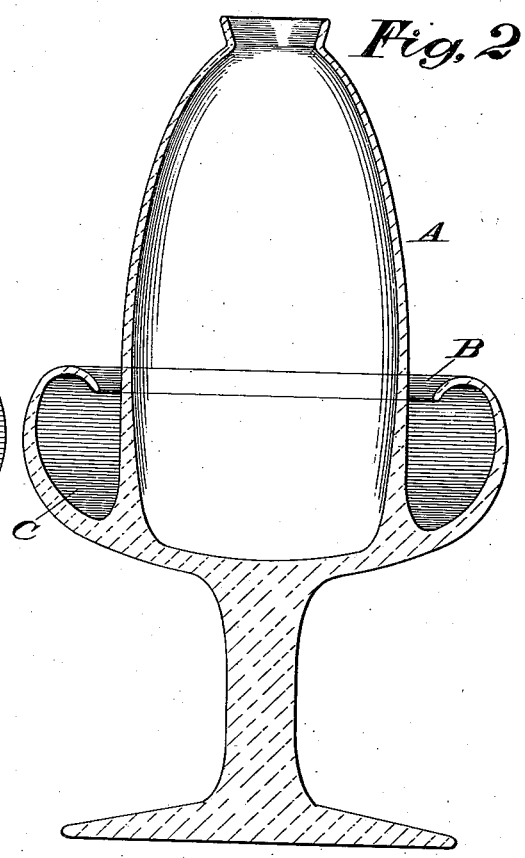
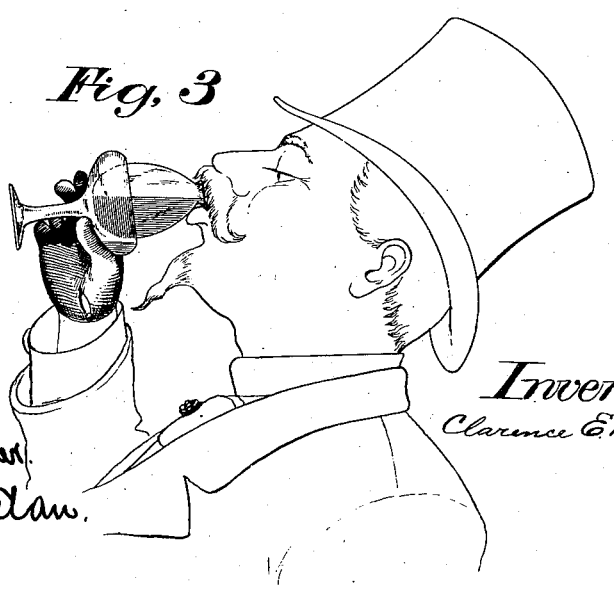
Witnesses,
Albert H. Walker
Garris H. Rheulan
Inventor,
Clarence E. Buckland

UNITED STATES PATENT OFFICE.

CLARENCE E. BUCKLAND, OF EAST HARTFORD, CONNECTICUT, ASSIGNOR TO JOHN N. BIDWELL, OF SAME PLACE.

DRINKING-GLASS.

SPECIFICATION forming part of Letters Patent No. 392,145, dated October 30, 1888.

Application filed May 12, 1888. Serial No. 273,702. (No model.)

*To all whom it may concern:*

Be it known that I, CLARENCE E. BUCKLAND, of East Hartford, Connecticut, have invented certain new and useful Improvements in Drinking-Glasses, of which the following is a specification.

This improvement relates to glasses used for drinking beer and the like viscid liquors; and the object of the improvement is to provide a glass with an annular channel located and constructed so as to catch and hold the overflowing froth in a manner more conducive to cleanliness than prior glasses for this purpose.

Referring to the accompanying drawings, Figure 1 is an exterior view of a drinking-glass constructed according to my invention. Fig. 2 is a view in central vertical section of same. Fig. 3 is a view illustrating the use of the glass.

The letter A indicates the body of the glass, which may be contracted at the top, as shown in the drawings, or may be made in any suitable shape.

The letter B indicates an annular flange, which projects from the exterior of the glass at a point sufficiently below the brim to permit of drinking from the brim without liability of rubbing the chin or beard against the flange, and which is far enough above the bottom of the glass to allow it to be grasped and held in the hand below the flange. This flange projects outward from the body, upward, inward, and downward, forming an annular channel, C, around the glass.

When my glass is filled with a viscid liquor and the froth runs over the top and down the sides, instead of running along the bottom of the glass or to the table, the froth is caught in my annular channel before reaching the bottom, thus leaving a clean portion below the flange which may be used to lift the glass without soiling the hands, also without soiling the table. The object of having the flange turn downward after projecting outward, upward, and inward is so that when the glass is inverted—as when draining the liquor from the bottom of the glass—the froth caught in the channel will be held in what is the top of the channel when the glass is upright without spilling out, as is the case with prior glasses for this purpose.

I claim as my improvement—

A drinking-glass the exterior wall of which is provided with an outwardly, upwardly, inwardly, and downwardly projecting flange forming an annular channel around the glass, said flange being located above the bottom of the glass a sufficient distance to permit the glass to be grasped by a hand below the flange, and being located sufficiently below the top to permit free drinking from the brim of the glass, substantially as described.

CLARENCE E. BUCKLAND.

Witnesses:
ALBERT H. WALKER,
CARRIE H. RHEUTAN.